(12) United States Patent
Bauer et al.

(10) Patent No.: US 9,115,821 B2
(45) Date of Patent: Aug. 25, 2015

(54) CONDENSATE VALVE

(75) Inventors: Heinz Bauer, Munich (DE); Josef Winnerl, Planegg (DE)

(73) Assignee: Bauer Kompressoren GmbH, München (DE)

( * ) Notice: Subject to any disclaimer, the term of this patent is extended or adjusted under 35 U.S.C. 154(b) by 559 days.

(21) Appl. No.: 13/501,380

(22) PCT Filed: Nov. 15, 2010

(86) PCT No.: PCT/EP2010/006942
§ 371 (c)(1),
(2), (4) Date: Apr. 11, 2012

(87) PCT Pub. No.: WO2011/060909
PCT Pub. Date: May 26, 2011

(65) Prior Publication Data
US 2012/0199523 A1      Aug. 9, 2012

(30) Foreign Application Priority Data

Nov. 20, 2009   (DE) .......................... 10 2009 054 064

(51) Int. Cl.
| F16K 11/02 | (2006.01) |
| F16K 31/40 | (2006.01) |
| F16K 17/06 | (2006.01) |
| F16T 1/14  | (2006.01) |

(52) U.S. Cl.
CPC ............ *F16K 31/408* (2013.01); *F16K 17/065* (2013.01); *F16K 31/406* (2013.01); *F16T 1/14* (2013.01); *Y10S 55/17* (2013.01)

(58) Field of Classification Search
None
See application file for complete search history.

(56) References Cited

U.S. PATENT DOCUMENTS 5,285,809 A * 2/1994 Shimoguri .................... 137/203

FOREIGN PATENT DOCUMENTS

| DE | 1 403 847 A1     | 3/1969  |
| DE | 35 02 518 A1     | 7/1986  |
| DE | 10 2005 055 360 A1 | 5/2007 |
| EP | 1 593 422 A2     | 11/2005 |

\* cited by examiner

*Primary Examiner* — Terry Cecil
(74) *Attorney, Agent, or Firm* — Roberts Mlotkowski Safran & Cole, P.C.; David S. Safran

(57) ABSTRACT

A condensate valve for condensate that is connectable to the inlet side of at least one oil/water separator of a compressor. The condensate valve is triggered for opening and closing via a blocking element. The outlet of the condensate valve discharges directly into a condensate collecting tank. The condensate valve also forms a pressure reducer for reducing the pressure of the outflowing condensate and discharges directly to the condensate collecting tank. Preferably, the condensate valve comprises a movable piston which can be pressed against a small-diameter opening of the valve seat when the condensate valve is closed by a blocking element. The piston has a larger cross-sectional area at its outlet side than at its inlet side on which condensate acts via an overflow line when the condensate valve has been opened. The overflow line can be formed by at least one through channel which extends axially through the piston.

6 Claims, 2 Drawing Sheets

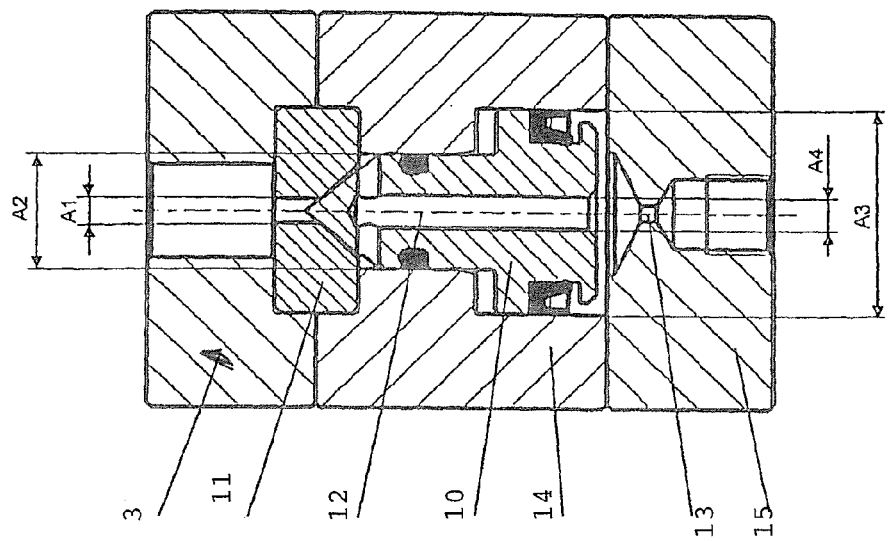
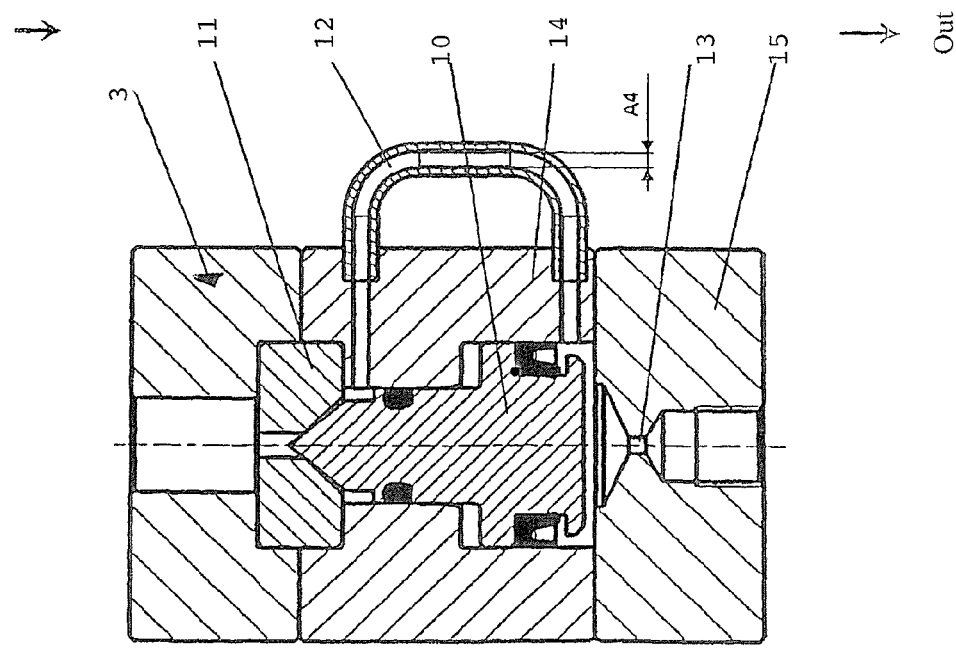

CONDENSATE VALVE

BACKGROUND OF THE INVENTION

1. Field of the Invention

The invention relates to a condensate valve for at least one oil-water separator on a compressor.

2. Description of Related Art

High and medium pressure compressors comprise oil/water separators for separation of oil and water from compressed air before the release of the pressurized air to the consumer. In particular, such a condensate drainage system is made as an automatic condensate drain by means of which all oil/water separators on high and medium pressure compressors can be automatically drained.

Some condensate drainage systems known to date are controlled by means of additional control air, and the system pressure of the compressor system is not reduced in the course of draining the condensate. When the condensate is drained, the drain volume thus becomes large and cannot be discharged directly into a condensate collection tank since the drained condensate must be decompressed beforehand in an additional tank. Due to the large drainage volume, the system pressure of the compressor system drops; this adversely affects the efficiency of the compressor system. When a condensate drainage system is actuated via additional control air, furthermore, there must be additional lines so that, viewed overall, a considerable effort for implementing such a condensate drainage system is necessary.

In other applications, the condensate valves are not attached directly to the oil/water separators of the compressor system, but are located separately, for which optionally still additional connecting lines must be provided between the oil/water separators and the condensate valves. For this reason, the construction, of course, also become more expensive.

There are also condensate drainage systems in which the condensate is discharged directly via piloted solenoid valves with a very small nominal diameter. The solenoid valves with a small nominal diameter are very sensitive to dirt, and moreover, these medium and high pressure solenoid valves for direct discharge of the condensate are ultimately expensive in their production costs. If, instead of solenoid valves with a small nominal diameter, one with a larger nominal diameter is chosen to avoid a tendency to fouling, such a large drainage volume is obtained that additional relief tanks, as intermediate tanks for the condensate, are necessary for decompression and damping.

There is also a condensate valve with an integrated solenoid valve which can be attached directly to an oil/water separator. This condensate valve, however, has an extremely complicated structure, is associated with high costs and is susceptible to faults since, to some extent, there are very small line cross sections in the condensate valve which easily tend to clog.

SUMMARY OF THE INVENTION

Therefore, for overcoming the above described difficulties, a primary object of this invention is to provide a condensate valve for at least one oil/water separator on a compressor, in which fault-proof discharge of the condensate without a notable adverse effect on the efficiency of the compressor system is achieved with few components in as economical a manner as possible.

According to the invention, a condensate valve through which condensate can flow is provided for this purpose; it can be connected to at least one oil/water separator of a compressor on the inlet side and can be opened and closed via a series-connected blocking element for discharge of the condensate and can be connected on the outlet side to a condensate collecting tank, which is characterized in that the condensate valve is made, at the same time, as a pressure reducer for reducing the pressure of the out-flowing condensate, and on the outlet side, there is a cross-sectional constriction, preferably a nozzle, for controlling and determining a small exhaust amount of the condensate flow which discharges directly into the condensate collecting tank.

With the condensate valve in accordance with the invention, controlled discharge of the condensate of the oil/water separator on high and medium pressure compressors takes place by a blocking element, such as, for example, a solenoid valve, which is used to open and close a condensate valve which is located in the condensate drainage system in order to carry out corresponding condensate drainage processes. Since the condensate valve through which the condensate flows in accordance with the invention is configured such that it also forms a pressure reducer for lowering the pressure of the discharging condensate, the pressure on the outlet side of the condensate valve can be greatly reduced relative to that on the inlet side and to the system pressure. This makes it possible to discharge the condensate on the outlet side of the condensate valve directly into an assigned condensate collecting tank without intermediate tanks. With the condensate valve in accordance with the invention, decompression takes place in the passage through the condensate valve so that an additional decompression tank is not necessary, as a result of which the overall construction can be greatly simplified and more economical. Since in the condensate valve in accordance, with the invention, the pressure in the condensate valve is greatly reduced, economical low pressure components can be connected downstream of the condensate valve so as to enable a further cost reduction.

Due to the outlet-side cross-sectional constriction, preferably in the form of a nozzle, a small drainage volume is always defined. This additional measure can ensure that the condensate from the outlet of the condensate valve can be discharged directly into a condensate collecting tank or a condensate tank without the need for a decompression tank or a muffler.

Furthermore, in accordance with the invention a condensate valve is made available which is characterized in that the condensate valve comprises a movable piston which, on the inlet side, can be pressed against a small-diameter opening of the valve seat when the condensate valve has been closed by the solenoid valve and that the piston on the outlet side has a large-diameter piston surface on which the condensate acts via an overflow line when the condensate valve has been opened by the solenoid valve. Due to the movable piston of the condensate valve which on the inlet side has a small cross section and on the outlet side has a large-diameter piston surface, with the discharge of the condensate by the condensate valve the pressure of the condensate is greatly reduced without significantly influencing the system pressure of the compressor system, and the condensate acts on this large-diameter piston surface via an overflow line. This overflow line with the condensate valve opened allows controlled discharge of the condensate from the oil/water separator or the oil/water separators of a compressor system. Due to the pressure reduction in the condensate valve, in accordance with the invention, a simplified configuration is obtained in terms of system technology since neither additional interposed relief or decompression tanks nor muffler devices are needed. Economical low pressure components can be used for the devices connected downstream of the condensate valve.

According to one preferred embodiment, the overflow line can be made as at least one through channel which extends axially through the piston and which is located preferably in the middle. This simplifies the construction of the condensate valve since the overflow line is integrated into the condensate valve and especially in the piston itself. In this way additional connecting lines which are associated with additional installation efforts can be avoided.

Preferably, the condensate valve is connected directly, i.e., without intermediate connecting lines, to at least one oil/water separator. In this way, a condensate valve can be mounted in a space-saving manner on a compressor. Installation effort is also simplified overall.

According to a preferred embodiment, the condensate valve comprises two housing parts, an upper housing part and a lower housing part. Advantageously, the piston is movably held in the upper housing part which has the valve seat which forms small diameter openings on the flow inlet side. Sealing hermetically tight, a housing lower part in which the cross-sectional constriction, preferably the nozzle, is formed in a channel which leads to the outlet of the condensate valve can then be connected coaxially to the housing upper part.

With respect to the cross-sectional dimensions, the following condition has been found to be important:

$$A1/A4<5$$

Where $A1$ is the cross section of the valve seat and $A4$ is the cross section of the overflow line. This ratio should preferably be less than 5 in order to ensure reliable operating conditions with the condensate discharge.

Preferably, in the condensate valve in accordance with the invention, the following must be maintained with respect to the dimensioning:

$$p/20<(A3-A2+A1)/A1<p/2$$

where $p$ is the operating pressure, $A1$ is the cross section of the valve seat, $A2$ is the small piston cross section and $A3$ is the large piston cross section. This inequality indicates that the system pressure, i.e., the pressure in the oil/water separator on the outlet side of the condensate valve should be reduced to a magnitude from 2 to 20 bar. The aforementioned information thus defines the step-down ratio for the pressure reducer depending on the inlet pressure, the pressure reducer being formed by the surfaces of the stepped piston with cross-sectional areas of different sizes.

In summary, in the condensate valve in accordance with the invention, it is important that this drainage system manages without additional decompression and muffler means. For this purpose, in the design in accordance with the invention, it is important that the condensate valve through which the condensate flows be made, at the same time, as a pressure reducer, for which purpose the condensate valve comprises, for example, a movable piston which has cross-sectional areas of varied size in assigned chambers in order to implement a considerable pressure reduction in the passage through the condensate valve. The condensate valve is furthermore designed such that it allows a direct discharge of the condensate at the outlet into a condensate collecting tank without interposed decompression means.

The invention is explained in detail below with reference to the accompanying drawings based on preferred embodiments without any limiting character.

BRIEF DESCRIPTION OF THE DRAWINGS

FIGS. 2A and 2B are schematic longitudinal sectional views through a preferred embodiments of a condensate valve in accordance with the invention.

DETAILED DESCRIPTION OF THE INVENTION

Figure 1:
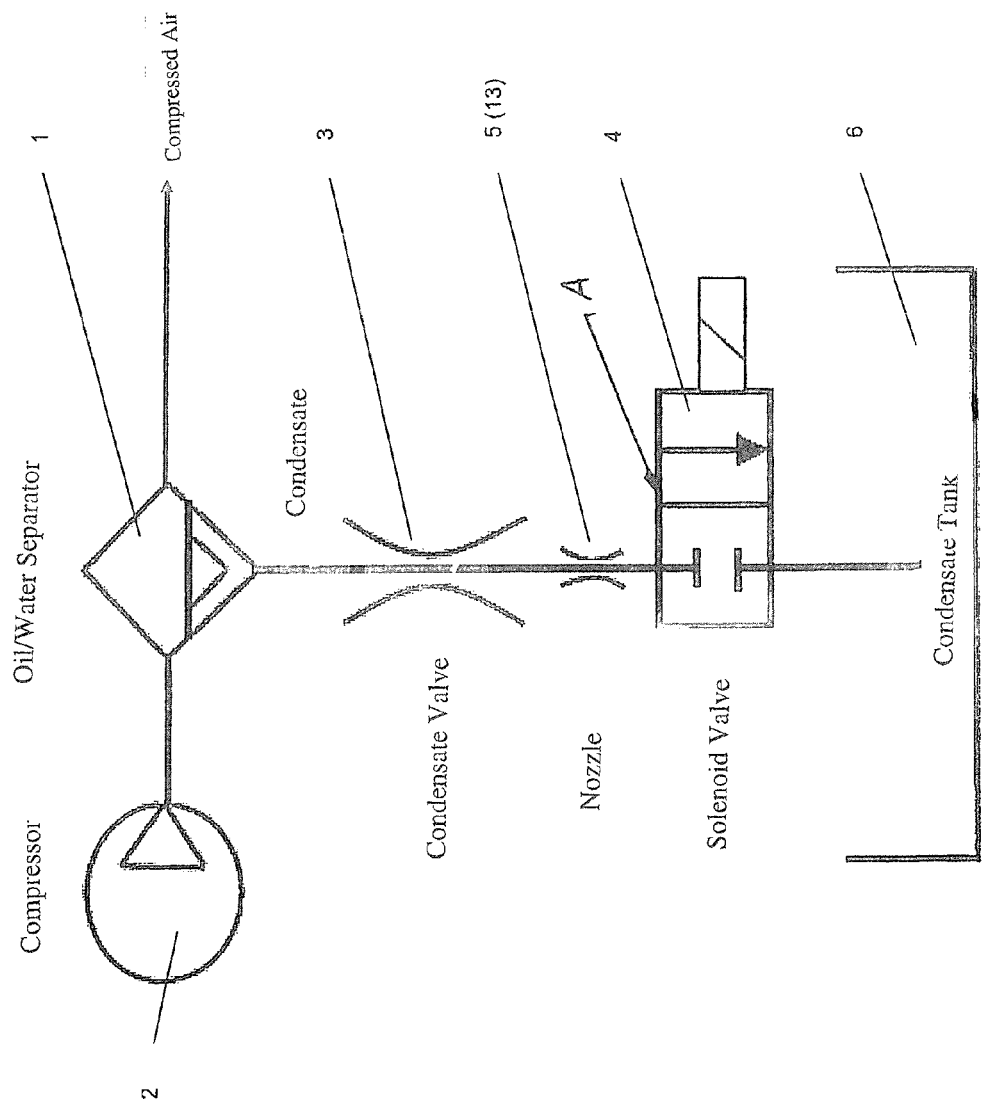
FIG. 1 is a schematic front view of a condensate drainage system with a condensate valve in accordance with the invention.

In the figures, the same or similar parts are provided with the same reference numbers.

The condensate drainage system shown schematically in FIG. 1 comprises an oil/water separator 1 which is in communication with a compressor 2 or with a corresponding stage of a compressor 2. These oil/water separators 1 are, by themselves, known. On the outlet side, the oil/water separator 1 is connected to a condensate valve 3 and through which the condensate of the oil/water separator 1 flows. The condensate valve 3 is triggered for opening and closing by a blocking element A, such as, for example, is an electrically triggered solenoid valve 4 in which the illustrated example is a 2/2-way solenoid valve. In the condensate valve 3, a cross-sectional constriction 5 in the form of a nozzle 13 is connected downstream and defines a small drainage volume which then is discharged on the outlet side from the blocking element A directly into a condensate tank or condensate collecting tank 6. This condensate drainage system works in such a way that the condensate drains such that a relief tank or muffler is not necessary.

FIGS. 2A and 2B show a preferred embodiment of the condensate valve 3 that is only schematically shown in FIG. 1. As already described, the condensate valve 3 can be connected on the inlet side to at least one oil/water separator 1 and can be opened and closed via the blocking element A, such as for example, solenoid valve 4, for discharging the condensate. The outlet side of the condensate valve 3 can be connected to a condensate collecting tank 6 as illustrated in FIG. 1.

In particular, the condensate valve 3 comprises a movable piston 10 which can be pressed against a small-diameter inlet opening with a cross section $A1$ (FIG. 2B) when the condensate valve 3 has been closed by means of the blocking element A or the solenoid valve 4, this small-diameter inlet opening in a valve seat 11 being arranged to seal tightly in the interior of the condensate valve 3. As is especially apparent from FIG. 2B, the movable piston 10 is a so-called stepped piston which, viewed in the direction in which the condensate flows (represented by arrows), has a diameter with a cross section $A2$ on the inlet side and a diameter with a cross section $A3$ on the outlet side. The cross-sectional area $A3$ is much larger than the cross-sectional area $A2$, and therefore, so that the condensate valve 3 in accordance with the invention using this stepped piston 10 forms a pressure reducer by a considerable reduction of the outlet pressure relative to the inlet pressure of the condensate valve 3 is achieved according to the cross-sectional ratios of $A1$, $A2$ and $A3$.

In the illustrated preferred embodiment of the condensate valve 3, the movable piston 10 contains an overflow line 12 through which condensate flows to the large-diameter piston surface $A3$ and acts on it when the condensate valve 3 has been opened. In FIG. 2A, the overflow line 12 is made as an external connecting line 12 in the region of the piston 10, for example. As FIGS. 2A and 2B show, in the outlet region of the condensate valve 3, there is a cross-sectional constriction, especially in the form of a nozzle 13. Using this cross-sectional constriction or nozzle 13, a small drainage volume of the condensate valve 3 can be defined so that direct discharge into the condensate tank 6 can take place and be accomplished without interposed devices, such as relief tanks, mufflers or the like.

As is furthermore apparent from FIGS. 2A and 2B, the condensate valve 3 in accordance with the invention is preferably formed of several parts. It comprises an upper housing 14 in which the piston 10 is movably accommodated, and which has the valve seat 11 which forms the small-diameter inlet opening. A housing bottom part 15 is coaxially connected, sealed tightly, to the upper housing 14, in which the cross-sectional constriction 5, such as the nozzle 13 in the outlet channel of the valve 3, is formed.

With respect to the ratios of cross-sectional areas A1 to A4 shown in FIG. 2B, the following is important. With respect to undisrupted throughflow operation, the following conditions must be maintained:

$$A1/A4<5$$

With respect to dimensioning and especially with respect to the pressure reduction which is accomplished in the condensate valve 3 in accordance with the invention, preferably the following inequality should be satisfied:

$$p/20<(A3-A2+A1)/A1<p/2$$

where p is the operating pressure, A1 is the cross section of the valve seat 11, A2 is the small piston cross section of the movable piston 10 and A3 is the large piston cross section of the stepped movable piston 10. This information expresses the fact that the operating pressure (the pressure in the oil/water separator) will be reduced to 2 to 20 bar. This information thus defines the step-down ratio for the pressure reducer depending on the operating pressure or inlet pressure.

In the version according to FIG. 2A, only the cross-sectional area A4 according to FIG. 2B is entered.

With reference to the above described details of the condensate valve 3, according to the invention, in summary, a design is given such that, at the outlet of each oil/water separator 1, a condensate valve is connected and installed essentially directly without interposed devices. The condensate valve 3 is pneumatically triggered via a blocking element A, preferably a 2/2-way solenoid valve 4. The outputs of the blocking element A or of the solenoid valve 4 discharge into the condensate tank or condensate collecting tank 6.

As FIGS. 2A & 2B show, in particular, in the upper housing part 14 of the condensate valve 3, there is a piston 10 which is sealed relative to the upper housing part 14, which can move in the longitudinal direction, and which is designed in the form of a stepped piston. At its lower end, the upper housing part 14 is closed by a housing bottom part 15 and is sealed with corresponding sealing elements.

The condensate valve 3 is closed in operation by the upper cone of the piston 10 being pressed into the small-diameter inlet opening in the valve seat 11 of diameter A1. The valve seat 11 is sealed relative to the oil/water separator 1 and relative to the upper housing part 14 using sealing elements which are shown schematically but without reference numerals.

The manner of operation will be briefly explained below. The condensate valve 3 acts as a pressure reducer and the pressure reducer ratio is found from the ratio between the input pressure p and the output pressure which is formed by the corresponding ratios of the small-diameter opening A1 of the valve seat 11 and the piston cross-sectional areas A2, A3. A small drainage volume which then allows a direct discharge from the blocking element A or solenoid valve 4 into the condensate tank 6 can be defined by the cross-sectional constriction 5 in the form of the nozzle 13 in the outlet channel 16. In doing so, condensate drainage takes place so gently that a relief tank or muffler is not necessary. As a result of the reduced pressure, components and assemblies which can be economical low pressure components can be connected downstream of the condensate valve 3.

The condensate drainage system works such that, when the compressor 2 is turned on, the blocking elements A and the solenoid valves 4 are closed and the pressure in the system rises. Due to the configuration of the stepped piston 10, the rising pressure produces a compressive force pointed in the direction of the valve seat 11 on the piston 10 and the latter is pressed against the valve seat 11. The condensate valve 3 is closed and the compressor 2 builds up its operating pressure and can deliver pressurized air.

For drainage of the condensate, the blocking element A or the solenoid valve 4 is opened for a short time, as a result of which the pressure in the space underneath the piston 10 drops so that the condensate valve 3 is opened by a downward movement of the piston 10. Thus, the condensate can flow out through the flow channels 12 which are used as overflow lines in the piston 10 or also externally (see, FIG. 2A) from the oil/water separator 1 and it acts on the large-cross section piston surface A3 of the piston 10. The condensate can then travel directly into the condensate tank 6 as it passes through the nozzle 13 (5). If the blocking element A or the solenoid valve 4 is closed again, the pressure underneath the piston 10 can rise again and the condensate valve 3 is closed, as described at the beginning. When the compressor system is being turned off, the blocking element A or solenoid valve 4 or all blocking element A or solenoid valves 4 are opened so that the condensate valve 3 or valves are also opened. The entire compressor system is vented in this way.

Although the invention was explained above using preferred embodiments, the invention is, of course, not limited to the details described there, but numerous modifications and alterations are possible which one skilled in the art will encounter as needed without departing from the idea of the invention.

What is claimed is:
1. A condensate drainage system, comprising:
a compressor or compressor stage,
a least one oil/water separator in communication with the compressor or compressor stage,
a condensate valve including an inlet which is connected to an outlet of said at least one oil/water separator,
a condensate collecting tank connected to an outlet of the condensate valve, and
a shut-off valve connected in series with said condensate valve for pneumatically triggering opening and closing of the condensate valve and operative for opening and closing discharge of condensate from the condensate valve to said condensate collecting tank,
wherein the condensate valve is constructed so as to also function as a pressure reducer which reduces the pressure of condensate flowing out of the condensate valve, the condensate valve comprising a movable piston having a smaller diameter piston surface on an inlet side in a direction of flow toward the condensate collecting tank that is pneumatically pressable against an inlet opening of a valve seat when the condensate valve is closed and an outlet side in a direction of flow toward the condensate collecting tank having a larger diameter piston surface than that of the smaller diameter piston surface on the inlet side of the piston such that the piston is able to control operating pressure at the inlet side of the condensate valve and for limiting flow of condensate into the condensate collecting tank to a small amount,
wherein a stationary cross-sectional constriction is located downstream of the movable piston for controlling and limiting condensate flowing directly into the condensate collecting tank to a small amount, an overflow line connecting the inlet and outlet sides of the piston for enabling condensate to act on both sides of the piston when the condensate valve is open for producing a pressure reduction which is a function of difference in cross-sectional areas of the inlet and outlet sides of the piston.

2. The condensate drainage system as claimed in claim 1, wherein the overflow line is comprises at least a through channel which extends axially through the piston.

3. The condensate drainage system as claimed in claim 1, wherein the condensate valve is connected directly to said at least one oil/water separator.

4. The condensate drainage system as claimed claim 1, wherein the condensate valve has a housing comprised of an upper housing part and a lower housing part, and wherein the movable piston and the valve seat with the inlet opening are located in the upper housing part.

5. The condensate drainage system as claimed in claim 1, wherein the shut-off valve comprises a solenoid valve.

6. The condensate drainage system as claimed in claim 1, wherein the constriction comprises a nozzle.

\* \* \* \* \*